United States Patent [19]

Schermer

[11] Patent Number: 4,763,967

[45] Date of Patent: Aug. 16, 1988

[54] TUNABLE RESONANT DEVICE

[75] Inventor: Mack J. Schermer, Cambridge, Mass.

[73] Assignee: General Scanning, Inc., Watertown, Mass.

[21] Appl. No.: 932,654

[22] Filed: Nov. 18, 1986

[51] Int. Cl.$^4$ .......................... G02B 26/10; G02B 7/02
[52] U.S. Cl. ..................................... 350/6.3; 350/253; 267/154
[58] Field of Search .................. 350/6.2, 6.6, 6.3, 486, 350/487, 253, 6.5, 606, 631, 637–639; 267/273, 154, 182; 248/DIG. 1; 33/125 T, 612, DIG. 19; 310/68 C, 36

[56] References Cited

U.S. PATENT DOCUMENTS

| | | | |
|---|---|---|---|
| 2,488,734 | 11/1949 | Mueller | 171/119 |
| 2,570,125 | 10/1951 | Hoare et al. | 177/311 |
| 2,640,866 | 6/1953 | Powell | 171/95 |
| 2,928,057 | 3/1960 | Jarger | 333/71 |
| 3,102,233 | 8/1963 | Charbonneaux | 324/125 |
| 3,256,769 | 6/1966 | Matthews et al. | 88/14 |
| 3,532,408 | 10/1970 | Dostal | 350/6 |
| 3,678,308 | 7/1972 | Howe | 310/36 |
| 3,742,234 | 6/1973 | Laakman | 250/235 |
| 3,811,748 | 5/1974 | Treuthart | 350/7 |
| 3,921,045 | 11/1975 | Reich et al. | 318/127 |
| 4,032,888 | 6/1977 | Broyles et al. | 340/146.3 |
| 4,037,231 | 7/1977 | Broyles et al. | 346/108 |
| 4,063,287 | 12/1977 | Van Rosmalen | 353/128 |
| 4,073,567 | 2/1978 | Lakerveld et al. | 350/6.5 |
| 4,274,101 | 6/1981 | Kataocka et al. | 346/108 |
| 4,302,720 | 11/1981 | Brill | 324/146 |
| 4,314,154 | 2/1982 | Minoura et al. | 250/235 |
| 4,318,582 | 3/1982 | Minoura et al. | 350/6.6 |
| 4,370,019 | 1/1983 | Shirasaki | 350/6.6 |
| 4,472,024 | 9/1984 | Konomura et al. | 350/247 |

FOREIGN PATENT DOCUMENTS

804694 11/1958 United Kingdom.

OTHER PUBLICATIONS

Montagu, U.S. Ser. No. 041,786, filed Apr. 23, 1987.
Stokes, U.S. Ser. No. 893,481, filed Aug. 5, 1986.
Tweed, D. G. "Linearizing Resonant Scanners", *Lasers and Applications*, Aug. 1985, pp. 65–69.
Tweed D. G. "Resonant Scanner Linearization Techniques." *Laser Scanning and Recording* 1984 p. 161.
Pelsue K., "Precision Post-Objective, Two Axis Galvanometer Scanning", SPIE vol. 390–*High Speed Read/-Write Techniques for Advanced Printing and Data Handling*, 1983.

*Primary Examiner*—John K. Corbin
*Assistant Examiner*—Ronald M. Kachmarik

[57] ABSTRACT

A dynamically resonant system including a linearly movable element having a neutral position and a range of excursion centered on the neutral position, a spring-like element for urging the movable element toward the neutral position, the resonant system having a natural resonant frequency dependent on the spring characteristics of the spring-like element, the spring-like element having a temperature sensitive member that causes the spring characteristics to vary with temperature of the member.

5 Claims, 2 Drawing Sheets

TUNABLE RESONANT DEVICE

BACKGROUND OF THE INVENTION

This invention relates to resonant systems in which the natural frequency of resonance is tunable.

The natural frequency of a resonant mechanical system, for example a rotational beam scanner or a linear actuator, is determined by the characteristics of the torsion bar or spring that urges the rotating element towards a central (neutral) position.

It is known to provide means (such as a set screw) to alter the spring characteristic from time to time to adjust the natural frequency of a rotating element to a desired value.

SUMMARY OF THE INVENTION

A general feature of the invention is a resonant system including a linearly movable element having a neutral position and a range of excursion centered on the neutral position, and a spring-like element for urging the movable element toward the neutral position; the resonant system has a natural resonant frequency dependent on the spring characteristics of the spring-like element, and the spring-like element has a temperature sensitive member that causes the spring characteristics to vary with temperature of the member. As a result, the natural resonant frequency of the system can be altered dynamically.

Preferred embodiments include the following features. The temperature of the member is caused to vary by resistively heating it. The member is an elongated metal piece, the heating is accomplished by forcing a current through the piece, and the heat causes the piece to change shape. The member is in tension and the degree of tension varies with temperature. The system includes a stationary base, the spring-like element has two spaced apart ends held in tension between supports associated with the base, and the linearly-movable element is held on the spring-like element in a location between its ends; changes in the temperature of the temperature-sensitive element cause corresponding changes in the tension on the spring-like element.

Other advantages and features of the invention will become apparent from the following description of the preferred embodiment, and from the claims.

DESCRIPTION OF THE PREFERRED EMBODIMENT

We first briefly describe the drawings.

Drawings

STRUCTURE AND OPERATION

Figure 1:
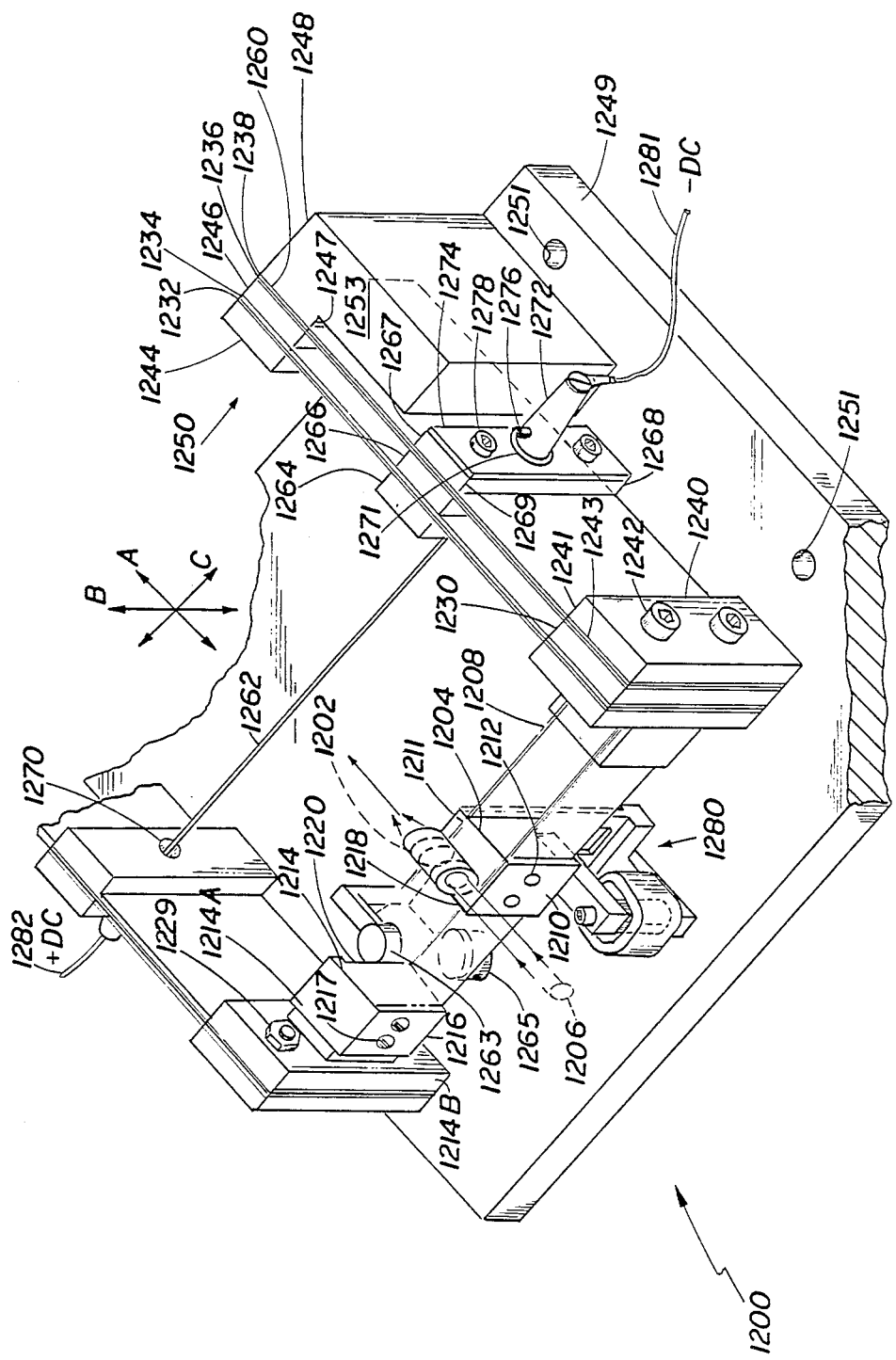
FIG. 1 is an isometric view, broken away, of a tunable resonant device.

Referring to FIG. 1, in a lens assembly 1200 for focusing a laser beam 1206 (e.g., as part of an X-Y scanner of the kind disclosed in copending U.S. patent application Ser. No. 06/932,924, Paulsen, Planar Surface Scanning System, filed on the same day as this application, assigned to the same assignee, and incorporated herein by reference) a lens 1202 is mounted in a nylon block 1204 (using two delrin screw nuts, not shown). Block 1204 is clamped between two hardened and tempered blue steel rectangular main flexures 1208 by two aluminum clamp plates 1210, 1211. Machine screws 1212 pass through holes in plates 1210, 1211, main flexures 1208, and block 1204 to hold clamp plates 1210, 1211 against flexures 1208.

Main flexures 1208 are clamped at both ends to aluminum T-shaped blocks 1214 (where the leg of the T is 1214A and the head of the T is 1214B) by aluminum clamp plates 1216 (again, each pair of plates 1216 are held by a pair of machine screws 1217 which pass completely through the clamp plates 1216, the block 1214, and the main flexures 1208).

Main flexures 1208 are 0.35 inch wide, 0.01 inch thick, and 3.700 inches long. The active length of the main flexures, i.e. between an edge 1218 of block 1204 and an edge 1220 of block 1214, is 1.10 inches. Leg 1214A of block 1214 is 0.350 inch along the B dimension, 0.350 inch along the C dimension, and 0.667 inch along the A dimension (to where it meets head 1214B) and is centered on head 1214B, which is 1.0 inch (B), by 0.5 inch (A), by 0.13 inch (C). Plate 1210 is 0.35 inch (B), by 0.5 inch (C), by 0.062 inch (A). (Plate 1211 is described further below.)

Flexures 1208 are kept parallel by block 1204 and blocks 1214. While flexible in the A direction, the flexures 1208 are extremely rigid in both the B and C directions. This rigidity, combined with the inherent rigidity of the rectangular structure of the main flexures, prevents unwanted angular or translational motion other than along the optical axis defined by beam 1206.

Clamped between each T-block 1214 and one of two corresponding aluminum spacer blocks 1230 is a second set of two hardened and tempered blue steel side flexures 1232, 1234. (There are two sets of two flexures 1232, 1234, one set each clamped to each T-block 1214). A third set of two side flexures 1236, 1238 is clamped between each spacer block 1230 and one of two corresponding aluminum outside blocks 1240. The entire assembly including T-block 1214, flexures 1232, 1234, spacer block 1230, flexures 1236, 1238, and outside block 1240 is held together by two machine screws 1242 which pass completely through the outside block, the spacer block and both sets of side flexures and are secured by nuts 1229. Each of the spacer blocks 1230 and the outside blocks 1240 is 1.0 inch (B), by 0.125 inch (C), by 0.5 inch (A).

Each of the two sets of side flexures 1232, 1234 and 1236, 1238 are likewise clamped together at their opposite ends by an outside block 1244, a spacer block 1246, and a base block 1248 all held together by a pair of machine screws 1250. Block 1248 is cut away along a face 1253 in order to provide clearance for the side flexures. Each of the spacer blocks 1246 and outside blocks 1244 have dimensions identical to blocks 1230, 1240. Base block 1248 is 2.1 inches along the B dimension and 1.25 inches along the A dimension. Along the C dimension, in the portion of block 1248 bordered by a face 1260, the block is 0.62 inch and, in the portion of block 1248 bordered by face 1253, the block is 0.025 inch thinner than the portion bordered by face 1260.

Base block 1248 is attached not only to the side flexures but also is fixed to an anchor plate 1249. Anchor plate 1249 is securable (in a fixed position relative to the film) to the remainder of the plotter via screws (not shown) in holes 1251.

The flexures 1232, 1234, and 1236, 1238 are all 2.975 inches (A), by 0.12 inch (C), by 1.0 inch (B). The active length of the side flexures 1232, 1234 and 1236, 1238 in the A dimension is 0.8 inch (the side flexures have two active lengths, one between an edge 1241 of block 1240 and an edge 1269 of a block 1268 (described below) and a second between an edge 1267 of block 1268 and an edge 1247 of block 1248, each 0.8 inch long).

Side flexures 1232, 1234 and 1236, 1238 are, like main flexures 1208, flexible in only a single (C) dimension. The side flexures are extremely rigid in both the A and B dimensions; this rigidity resists the reaction force of the resonating lens assembly.

The side flexures are provided in pairs so as to resist motion in the C dimension. As the side flexures bend, the face of side flexure 1232 rubs against the face of side flexure 1234; the friction between the two flexures causes a large shearing force which highly damps any oscillation due to the bending motion. (Flexures 1236, 1238 likewise provide damping.)

The two corresponding faces 1260 of base blocks 1248 (only one base block 1248 is seen in FIG. 1) to which side flexures 1236, 1238 are clamped are spaced apart from one another (along the A dimension) 4.500 inches, which is 0.025 inch wider than the corresponding faces 1243 of end blocks 1240, thus springloading the side flexures and placing the main flexures under tension.

Each active length of the side flexures 1232, 1234, 1236, 1238 has a combined spring rate of 410 pounds per inch; however, because there are two active lengths (i.e. between block 1240 and block 1268 and between block 1268 and block 1248) the effective spring rate is reduced to approximately half, or 200 pounds per inch; finally, since there are one group of side flexures on either end of the main flexures, the combined effective spring rate is 400 pounds per inch (2×200 pounds per inch.).

When there is no tension placed on main flexures 1208 the system has a resonant frequency of 180 Hz. However, with the tension exerted by the side flexures 1232, 1234 and 1236, 1238 (about ten pounds, i.e., 0.025 inches×400 pounds per inch) the resonant frequency of the system is increased to 220 Hz. This results in a tunable range of 40 Hz, or plus or minus 20 Hz from the nominal (i.e. median) frequency of 200 Hz (achieved with five pounds added tension from the side flexures).

The lens system is driven in resonant motion by a magnetic drive 1280, termed an induction drive scanner (described in U.S. Pat. No. 4,502,752, incorporated herein by reference).

During operation, magnetic drive 1280 causes lens assembly 1200, to oscillate harmonically at its resonant frequency.

In order to provide the capability to dynamically adjust the tension applied by the side flexures and thus the resonant frequency of the system, a wire 1262 composed of shape memory metal (e.g. Nitinol, commercially available from Special Metals Corp., New York) is attached at either end to each of the two sets of side flexures by another set of blocks 1264, 1266, 1268 which clamp the side flexures (and keep them parallel); the wire 1262 passes through a hole 1270 in blocks 1264, 1266, 1268, through a nylon washer 1271 (Grade 6/6, commercially available from Keystone Electronics Corp., N.Y., N.Y.), and into a hole in a brass (0.312 free machining brass plated with 0.0002-0.0004 electroless nickel) stem portion 1272 of a clamp plate 1274 where it is held by a set screw 1276. The assembly is held together by a pair of machine screws 1278.

Attached to the ends of each stem 1272 (only one shown) are conventional wires 1281, 1281 to which a DC current may be applied. Wire 1262, which is six inches long and 0.32 inches in diameter, shrinks (up to 8 percent) when heated. The current passing through the wire causes an increase in temperature which in turn causes the wire to shrink; as the wire shrinks it pulls the side flexures on either side of assembly 1200 inward towards one another, thereby decreasing the tension on main flexures 1208. By electronically controlling the amount of current and hence the degree of tension on the main flexures 1208, the resonant frequency of the system can be controlled.

At different points in time the frequency of the lens assembly will require adjustment. The adjustment is carried out while the lens assembly is oscillating and is performed by applying a DC current to the wire 1262 of appropriate magnitude to increase the tension and thereby increase the resonant frequency of the system. Conversely, the frequency of the system may be lowered (if it is greater than 180 Hz, the minimum resonant frequency) by decreasing the amount of current in wire 1262, allowing it to cool and expand.

Figure 2:
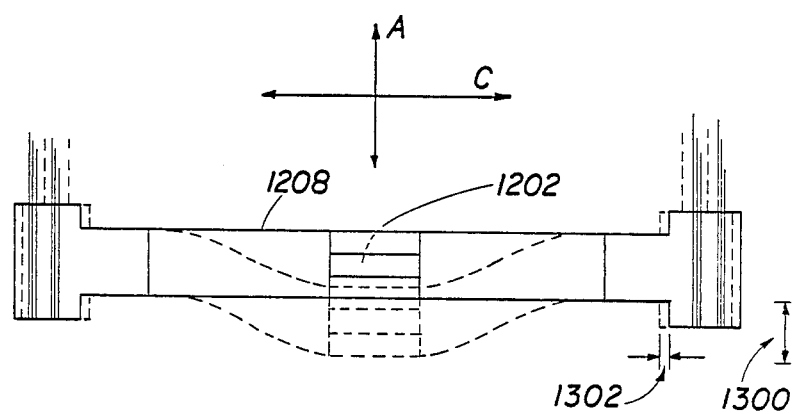
FIG. 2 is a diagram showing deflection of the movable element of the device.

Referring to FIG. 2, lens assembly 1200 is shown in its center (or rest) position (solid lines). The location of the lens assembly at one of two points of maximum excursion is indicated by dotted lines. As the lens moves from its rest position, main flexures 1208 must bend (in the A dimension); as they bend, their length along the C dimension is effectively shortened; thus the side flexures must bend toward the lens and one another in the C dimension. The peak amplitude 1300 of the lens in the A dimension is 1.5 mm, which translates into a maximum deflection 1302 of 0.002 inch for the side flexures.

While it is desirable that the tension on the main flexures be constant over the entire range of motion of the lens assembly, the deflection of the side flexures causes some increased tension; however, given the spring rate of 400 pounds per inch and the maximum deflection of 0.002 inch, the deviation between the tension applied to the main flexures in the rest position and in the maximum excursion position is only 0.8 pounds, a sufficiently close approximation to 0 pounds, the desired deviation.

Other embodiments are within the following claims. For example, by choosing different parameters for various elements of lens assembly 1200 (particularly the dimensions of the side and main flexures) a different range of resonant frequencies can be achieved. The tunable range of the lens assembly is generally 10% of the nominal resonant frequency. The achievable nominal resonant frequencies are, approximately, from 20 Hz to 1000 Hz.

I claim:

1. A resonant system comprising
    a linearly movable element having a neutral position and a range of excursion centered on said neutral position, and
    a spring-like element for urging said movable element toward said neutral position,
    said resonant system having a natural resonant frequency dependent on the spring characteristics of said spring-like element,
    said spring-like element having a temperature sensitive member that causes said spring characteristics to vary with temperature of said member.

2. The system of claim 1 wherein said temperature of said member is caused to vary by resistively heating said member.

3. The system of claim 2 wherein said member is an elongated metal piece, said heating is accomplished by forcing a current through said piece, and said heat causes said piece to change shape.

4. The system of claim 1 or 3 wherein said member is in tension and the degree of said tension varies with said temperature.

5. The system of claim 1 further comprising a stationary base, and wherein said spring-like element has two spaced apart ends fixed on supports associated with said base, said spring-like element being held in tension between said supports, said linearly-movable element is held on said spring-like element in a location between said ends, and changes in the temperature of said temperature-sensitive element cause corresponding changes in the tension on said spring-like element.

* * * * *

UNITED STATES PATENT AND TRADEMARK OFFICE
CERTIFICATE OF CORRECTION

PATENT NO. : 4,763,967

DATED : August 16, 1988

INVENTOR(S) : Mack J. Schermer

It is certified that error appears in the above-identified patent and that said Letters Patent is hereby corrected as shown below:

Under U.S. PATENT DOCUMENTS, "Kataocka" should be --Kataoka--;

Col. 2, line 19, "1.0" should be --1.000--;

Col. 2, line 20, "0.5" should be --0.500--; same line "0.35" should be --0.350--;

Col. 2, line 21, "0.5" should be --0.500--;

Col. 2, line 45, "0.5" should be --0.500--.

Signed and Sealed this

Seventeenth Day of January, 1989

Attest:

DONALD J. QUIGG

Attesting Officer

Commissioner of Patents and Trademarks